United States Patent [19]

Knothe et al.

[11] 4,248,438
[45] Feb. 3, 1981

[54] MECHANICAL RECORD CUTTING METHOD

[75] Inventors: Herbert Knothe, Neumünster; Horst Redlich, Berlin; Klaus Röschmann, Nortorf, Schülp, all of Fed. Rep. of Germany

[73] Assignee: Teldec-Telefunken-Decca Schallplatten GmbH, Hamburg, Fed. Rep. of Germany

[21] Appl. No.: 21,972

[22] Filed: Mar. 19, 1979

[30] Foreign Application Priority Data

Mar. 18, 1978 [DE] Fed. Rep. of Germany ....... 2811888

[51] Int. Cl.³ .............................................. G11B 3/00
[52] U.S. Cl. .................................... 369/127; 369/283
[58] Field of Search ................... 274/41 R, 42 R, 46 R

[56] References Cited

U.S. PATENT DOCUMENTS

| 393,967 | 12/1888 | Edison | 274/46 R |
|---|---|---|---|
| 1,107,502 | 8/1914 | Emerson | 274/46 R |
| 1,421,045 | 6/1922 | Wadsworth | 274/46 R |
| 1,851,327 | 3/1932 | Ramsey | 274/46 R |
| 2,040,693 | 5/1936 | Huguenard | 274/46 R |
| 2,137,307 | 11/1938 | Rabald | 274/42 R |
| 4,044,379 | 8/1977 | Halter | 274/46 X |

FOREIGN PATENT DOCUMENTS

| 905426 | 3/1954 | Fed. Rep. of Germany | 274/46 R |
| 1291529 | 3/1969 | Fed. Rep. of Germany . | |

Primary Examiner—Harry N. Haroian
Attorney, Agent, or Firm—Spencer & Kaye

[57] ABSTRACT

In an apparatus for forming a groove which is modulated to present an information track in a signal record carrier having a copper surface portion by cutting such groove into the copper surface portion by means of a cutting stylus, the stylus is formed to present, during cutting, a rake angle of between 10° and 20°, and the copper constituting the surface portion into which the groove is cut has a Vickers hardness of between 110 and 300, and preferably between 120–220.

4 Claims, 1 Drawing Figure

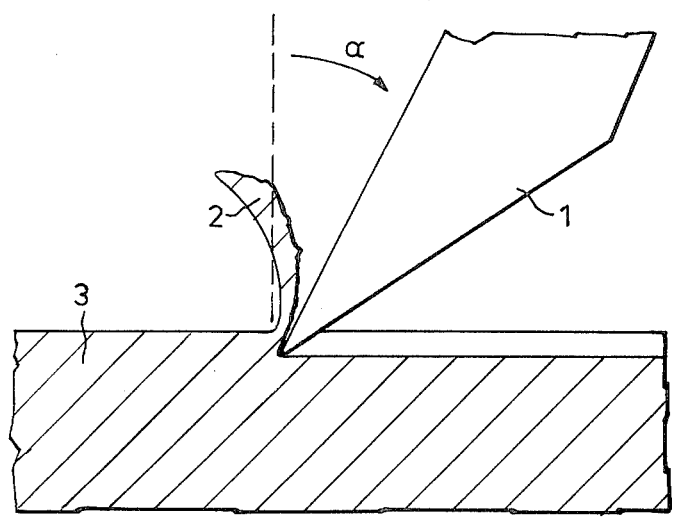

MECHANICAL RECORD CUTTING METHOD

BACKGROUND OF THE INVENTION

The present invention relates to a method for mechanically cutting a groove modulated with information in a master disc having a copper surface. The cutting of audio signal recordings into metal surfaces is already well-known in the art, typical techniques being disclosed in German Pat. No. 66,942 and French Pat. No. 76 21636.

It is also already known to cut video signal recordings into record carriers by electromechanically cutting a groove modulated with video information into metal matrices, or masters, an individual groove being cut to a quiescent depth of less than one micron, as disclosed in U.S. Pat. No. 4,044,379 to Halter. Such a method requires the formation of a special surface on the metal master. According to the known method, an electrochemically deposited copper layer is smoothed in a subsequent special process step in order to make the surface to be recorded relatively flat.

SUMMARY OF THE INVENTION

It is the object of the present invention to provide an improved method for mechanically cutting a groove having a modulated depth in a record master having a copper surface which permits elimination of complicated measures for pretreating the metal surface to make it planar.

One advantage of the method according to the invention is that it enables grooves to be cut to a depth of more than one micron, even to a depth of 0.15 mm, as is required for the recording of audio signals which are to be played back on conventional record players.

The novel method of the invention makes it possible to cut recordings of video signals on metal surfaces which are only approximately planar, e.g. surfaces with an irregularity of more than one micron.

It is here of advantage to use the technique disclosed in U.S. Pat. No. 3,528,665 to Redlich to cut the groove. While this technique has heretofore been used only to cut grooves into lacquer foils, it has now been found that it can also be used to cut a recording groove in a metal surface if the cutting is effected according to the novel method of the invention.

The objects of the present invention, for cutting a groove in a metal surface of a master disc to a depth of more than 1 micron, are achieved by cutting the groove with a cutting stylus which presents a cutting angle, between its cutting face and the normal to the groove axis, of between 10° and 20° and by employing a copper layer into which the groove is being cut having a Vickers hardness of between 110 and 300, preferably between 120 and 220. It has been found that only when both of these conditions are met, will a perfect recording of the signals result with a sufficiently smooth surface.

BRIEF DESCRIPTION OF THE DRAWING

The sole FIGURE is a simplified elevational, cross-sectional view of a portion of the metal surface of a master in which a cutting stylus is cutting a groove according to the invention.

DESCRIPTION OF THE PREFERRED EMBODIMENTS

The FIGURE illustrates a cutting stylus 1 in the process of cutting a groove, which involves removing a chip 2 from the metallic surface 3 of a record master, with the stylus being formed and oriented to present a rake angle $\alpha$ of about 15°.

In the prior art method for cutting a depth modulated groove in a metal master disclosed in U.S. Pat. No. 4,044,379, the cutting face of the cutting stylus is oriented perpendicularly to the surface of the metal master during cutting, i.e. the rake angle is 0°. Such an orientation of the cutting face would allow the chip to separate from the surface 3 only with difficulty if the cutting depths are greater than a few microns.

In order to be able to cut a perfect chip during cutting of the groove, the metal surface according to the invention is given a Vickers hardness which lies in the range between 110 and 300, and preferably between 120 and 220.

Electrochemical metal deposits having a Vickers hardness of 90, as they are obtained, for example, from electroplating baths without a glazing additive, have been found to be unsuitable since they are predisposed to experience a form of deformation which is analogous to "smudging" during the groove cutting. Conversely, surfaces which are too hard usually have the result that the recording breaks out of the surface.

With suitable glazing additives, the desired Vickers hardness and the desired surface consistency of the electrochemically deposited metal layer can be attained.

A metal surface coating of advantage for the present invention is a layer produced electrochemically, i.e. by electrodeposition, from chalcocite, or copper glance, baths; it meets the stated requirements regarding cutting behavior.

A surface layer according to the invention may be produced, for example, from a bath of the following composition:
  210–250 g/l $CuSo_4 \cdot 5H_2O$;
  80–110 g/l $H_2SO_4$;
  70–110 mg/l chlorine ions;
  1.3 ml/l glazing additive A (made by the Dehydag company);
  150 mg/l Glosser M 5 (made by the Dehydag company).

A coating of a thickness of 50 to 100 microns is produced at a current density of 3–6 $A/dm^2$ at 25°–35° C. This coating has a Vickers hardness of 110–300, it being desirable to select the bath composition, particularly by adjusting the glazing additive content, so that a Vickers hardness of 120–220 is attained.

The substrate, in the form of a disc, for such an electrochemically deposited surface coating that has been found to be particularly suitable is a stainless steel substrate onto which the copper coating can be applied.

In order to assure a good bond between the substrate and the surface coating, an intermediate layer, particularly of a nickel-based composition, can be provided which advantageously is applied from a bath which has a high chloride content. For such a nickel intermediate layer the following bath can be used, for example:
  100 g/l $NiCl_2 \cdot 6H_2O$; and
  HCl up to a pH of 1.0–1.5. It can be deposited under the following conditions:
  current density 4–6 $A/dm^2$;
  period of exposure 1–3 minutes;

bath operated at room temperature; and
layer thickness of a few microns.

By applying the cutting stylus to the copper surface at a rake angle according to the present invention, and causing the copper layer to have a Vickers hardness of between 110 and 300, and particularly 120-220, it is possible to produce a chip of sufficient thickness which will not break and at the same time to modulate the groove with the high signal density required, for example, for the production of video records, with the necessary surface quality.

Experience has shown that the error ratio during cutting of a signal modulation into a metal layer according to the invention is less than during cutting of a conventional lacquer foil.

The groove is advisably cut by means of a diamond cutting stylus.

It will be understood that the above description of the present invention is susceptible to various modifications, changes and adaptations, and the same are intended to be comprehended within the meaning and range of equivalents of the appended claims.

What is claimed is:

1. In a method for forming a signal record carrier having a groove which is modulated to present an information track by providing a copper-containing bath, electrolytically depositing a thin layer of copper from the bath onto a substrate, and cutting such groove into the surface of the copper layer by means of a cutting stylus, the improvement wherein said stylus presents, during cutting, a rake angle of between 10° and 20°, and said bath contains at least one glazing additive which imparts a Vickers hardness of between 110 and 300 to said copper layer.

2. A method as defined in claim 1 wherein the at least one additive in said bath gives the copper a Vickers hardness of between 120 and 220.

3. A method as defined in claim 1 or 2 wherein the cutting stylus is constituted by a diamond.

4. A method as defined in claim 1 or 2 wherein the cutting stylus has a triangular cross section and said step of cutting is carried out by rotating the copper layer and its associated substrate relative to the stylus while applying to the stylus a sufficiently great cutting force to cause it to cut a groove whose average depth is such that none of the original surface of the copper layer will remain between adjacent turns of the groove.

* * * * *